United States Patent
Kawakita et al.

(10) Patent No.: US 12,455,613 B2
(45) Date of Patent: Oct. 28, 2025

(54) METHOD AND SYSTEM FOR INDICATING SYSTEM STATE IN CAMERA-UNDER-DISPLAY CONFIGURATIONS

(71) Applicant: Lenovo (Singapore) Pte. Ltd., Singapore (SG)

(72) Inventors: Koji Kawakita, Kanagawa (JP); Sean C. Kelly, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 217 days.

(21) Appl. No.: 17/979,906

(22) Filed: Nov. 3, 2022

(65) Prior Publication Data

US 2024/0152198 A1 May 9, 2024

(51) Int. Cl.
G06F 1/3296 (2019.01)
G06F 1/16 (2006.01)
G06F 1/3231 (2019.01)
G06F 21/32 (2013.01)

(52) U.S. Cl.
CPC .......... *G06F 1/3296* (2013.01); *G06F 1/1686* (2013.01); *G06F 1/3231* (2013.01); *G06F 21/32* (2013.01)

(58) Field of Classification Search
CPC .... G06F 1/3296; G06F 1/1686; G06F 1/3231; G06F 21/32
See application file for complete search history.

(56) References Cited

U.S. PATENT DOCUMENTS

| | | | | |
|---|---|---|---|---|
| 11,153,427 B2* | 10/2021 | Chi | | G06F 3/04847 |
| 11,551,634 B1* | 1/2023 | Seethaler | | H04M 1/0264 |
| 11,671,692 B2* | 6/2023 | Hou | | H04N 23/56 |
| | | | | 348/374 |
| 12,166,916 B2* | 12/2024 | Cui | | G06F 21/6245 |
| 2014/0281607 A1* | 9/2014 | Tse | | G06F 1/3287 |
| | | | | 713/320 |
| 2018/0367656 A1 | 12/2018 | Kim et al. | | |
| 2021/0132769 A1 | 5/2021 | Parikh et al. | | |
| 2021/0149441 A1* | 5/2021 | Bartscherer | | G06F 1/1616 |
| 2022/0116546 A1* | 4/2022 | Gummadi | | H04N 23/57 |
| 2022/0268567 A1* | 8/2022 | Zang | | H04M 1/0266 |
| 2023/0054033 A1* | 2/2023 | Lee | | G06F 1/1652 |

FOREIGN PATENT DOCUMENTS

WO 2021258394 A1 12/2021

OTHER PUBLICATIONS

Extended European Search Report issued in corresponding European Patent Application No. 23203213.6, dated Jan. 4, 2024 (11 pages).

* cited by examiner

*Primary Examiner* — Brian T Misiura

(74) *Attorney, Agent, or Firm* — Osha Bergman Watanabe & Burton LLP

(57) ABSTRACT

A computer system includes a display panel, at least one camera disposed under the display panel, and a processing system. The processing system includes a display driver circuit, a system processor, and a vision chip. The vision chip, independently from the system processor, processes image data captured by the at least one camera through the display panel, updates a state of the computer system based on the image data, and instructs the display driver circuit to drive the display panel to display a system state indicator symbol indicating the state of the computer system.

14 Claims, 8 Drawing Sheets

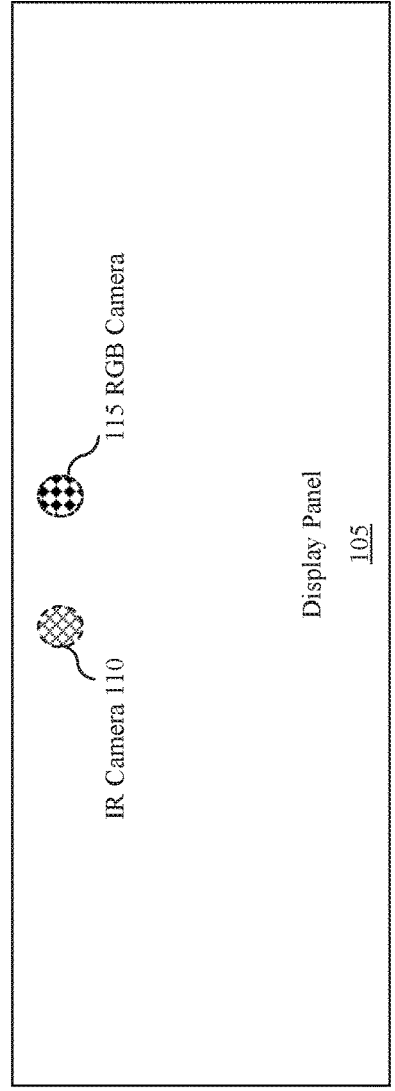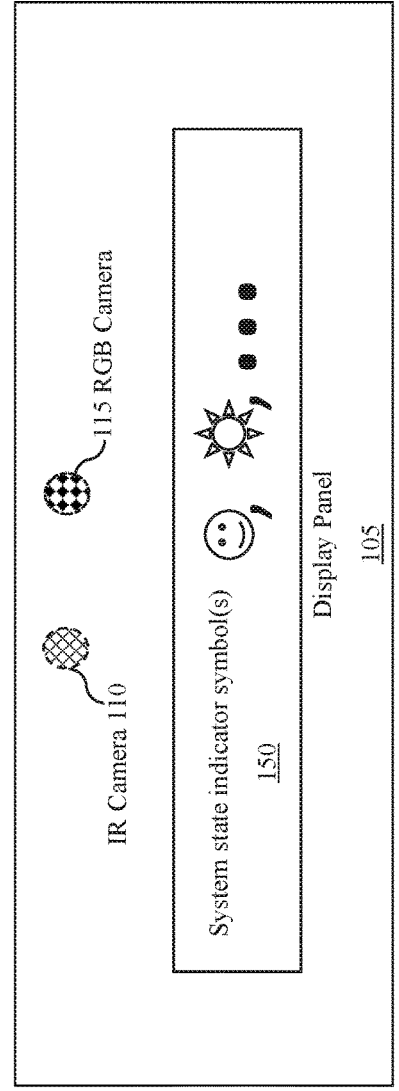

METHOD AND SYSTEM FOR INDICATING SYSTEM STATE IN CAMERA-UNDER-DISPLAY CONFIGURATIONS

BACKGROUND

Camera-Under-Display (CUD) configurations in which one or more cameras are under a display (e.g., facing the user through the display) are increasingly popular for various reasons. For example, CUD configurations enable laptop designs with no bezel, while still providing camera functionality, e.g., for video conferencing. However, in absence of dedicated status indicator lights, one possible concern is that it may be difficult for the user to tell whether the camera is active or not.

SUMMARY

In general, in one aspect, embodiments relate to a computer system comprising: a display panel; at least one camera disposed under the display panel; and a processing system comprising: a display driver circuit; a system processor; and a vision chip that independently from the system processor: processes image data captured by the at least one camera through the display panel, updates a state of the computer system based on the image data, and instructs the display driver circuit to drive the display panel to display a system state indicator symbol indicating the state of the computer system.

In general, in one aspect, embodiments relate to a method for indicating a state of a computer system, the method comprising: processing image data obtained from at least one camera, by a vision chip independently from a system processor; updating the state of the computer system, by the vision chip independently from the system processor, based on the image data; and instructing a display driver circuit, by the chip independently from the system processor, to drive a display panel to display a system state indicator symbol indicating the state of the computer system.

BRIEF DESCRIPTION OF DRAWINGS

FIG. 1B shows an illustration of a camera-under-display configuration in accordance with one or more embodiments of the disclosure.

FIG. 1C shows an illustration of a camera-under-display configuration in accordance with one or more embodiments of the disclosure.

DETAILED DESCRIPTION

Figure 1A:
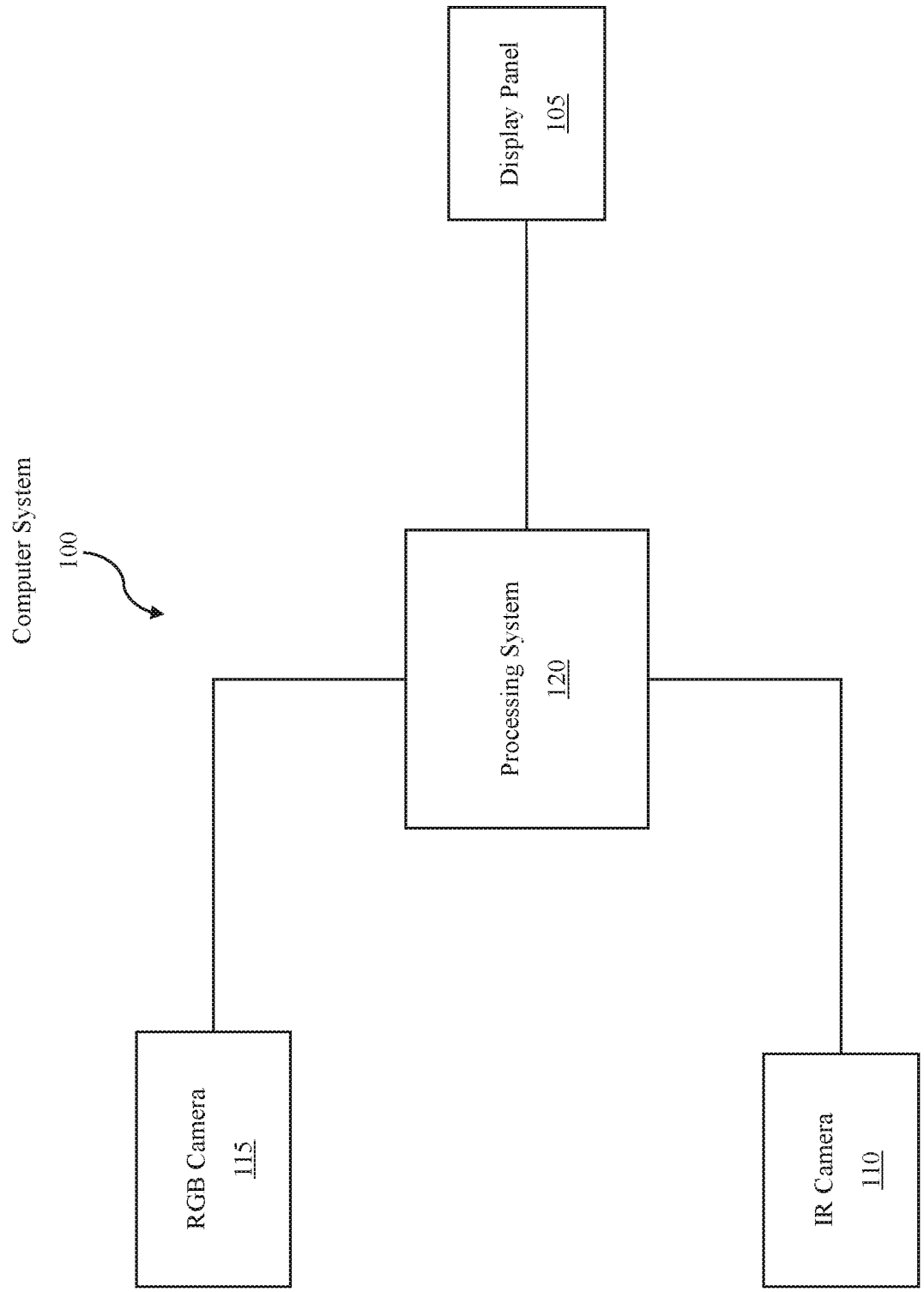
FIG. 1A shows a block diagram of a computer system in accordance with one or more embodiments of the disclosure.

Specific embodiments of the present disclosure will now be described in detail below with reference to the accompanying drawings. Like elements in the various figures are denoted by like reference numerals for consistency.

In the following detailed description of embodiments of the disclosure, numerous specific details are set forth to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third) may be used as an adjective for an element (e.g., any noun in the application). The use of ordinal numbers is not intended to imply or create a particular ordering of the elements nor to limit any element to being only a single element unless expressly disclosed, such as using the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

In general, embodiments of the disclosure provide a method, non-transitory computer readable medium (CRM), and a computer system for indicating system state in Camera-Under-Display (CUD) configurations. CUD configurations in which one or more cameras are under a display (e.g., facing the user through the display) are increasingly popular for various reasons. For example, CUD configurations enable laptop designs with no bezel, while still providing camera functionality, e.g., for video conferencing. However, in absence of dedicated status indicator lights, one possible concern is that it may be difficult for the user to tell whether the camera is active or not. Embodiments of the disclosure indicate a system state in the display. For example, a symbol may be displayed to indicate that the camera is active or inactive. Embodiments of the disclosure are capable of indicating the system state even when the system is in sleep mode. A detailed description is subsequently provided in reference to the figures.

FIG. 1A shows a block diagram of a computer system in accordance with one or more embodiments of the disclosure. The computer system 100, in one or more embodiments, includes one or more cameras 110, 115 and a display panel 105. In one or more embodiments, the one or more cameras 110, 115 are arranged under the display panel 105 in a camera-under-display (CUD) configuration. With the one or more cameras being under the display panel, the computer system 100 may have no bezel surrounding the display panel. The computer system 100 may be, for example, a laptop personal computer (PC) or a tablet computer. The computer system 100 may further be any other type of system that includes a display panel and one or more cameras disposed behind the display panel.

The display panel 105 may be any type of display panel that allows the camera(s) 110, 115 to see through the display panel 105. For example, the display panel may be a display panel that does not require backlighting. For example, the display panel 105 may be an organic light-emitting diode (OLED) panel, a micro-LED panel, etc.

The cameras may include an infrared (IR) camera 110 and/or an RGB camera 115. Any types of cameras, e.g., CCD cameras, CMOS cameras, etc. may be used.

The processing system 120 may include various circuits, e.g., a central processing unit (CPU), display driver circuits, and/or other circuits. A detailed description is provided below in reference to, for example, FIG. 2.

FIG. 1B shows an illustration of a CUD configuration 130 in accordance with one or more embodiments of the disclosure. The camera(s) 110, 115 are disposed under the display panel 105. Placing the camera(s) 110, 115 under the display panel 105 has several potential advantages. For example, the display panel 105 may be provided without a bezel. This may result in a larger display-to-body ratio (a measure of how much the display panel covers the front face of the computer system) and a better user perceptive experience. Further, placing the cameras 110, 115 at or near the center of the display panel 105 may significantly improve teleconferencing experiences with superior gaze tracking and eye contact.

FIG. 1C shows an illustration of a CUD configuration 160 in accordance with one or more embodiments of the disclosure. System state indicator symbols 150 may be displayed on the display panel 105 to indicate the state of the computer system 100. One or more system indicator symbols may be displayed at once. The system state indicator symbols 150 may be of any type and may include symbols, a messages, animations, or any combinations thereof. Each of the system state indicator symbols 150 may be of any size, color, and/or brightness and may be static, pulsating, and/or animated. A system state indicator symbol 150 may be displayed around the camera (s) 110, 115 or at any other suitable position in the display panel 105.

The state of the computer system may include but is not limited to the state of the IR camera 110, the state of the RGB camera 115 (e.g., active vs deactivated), the state of the overall system (powered vs sleeping), particular operating modes (e.g., user presence detection, user authentication), etc.

Distinct system state indicator symbols may be provided for each one of the IR camera 110 and RGB camera 115, the state of the overall system, operating modes, etc. Additional details and examples are provided below.

Figure 2:
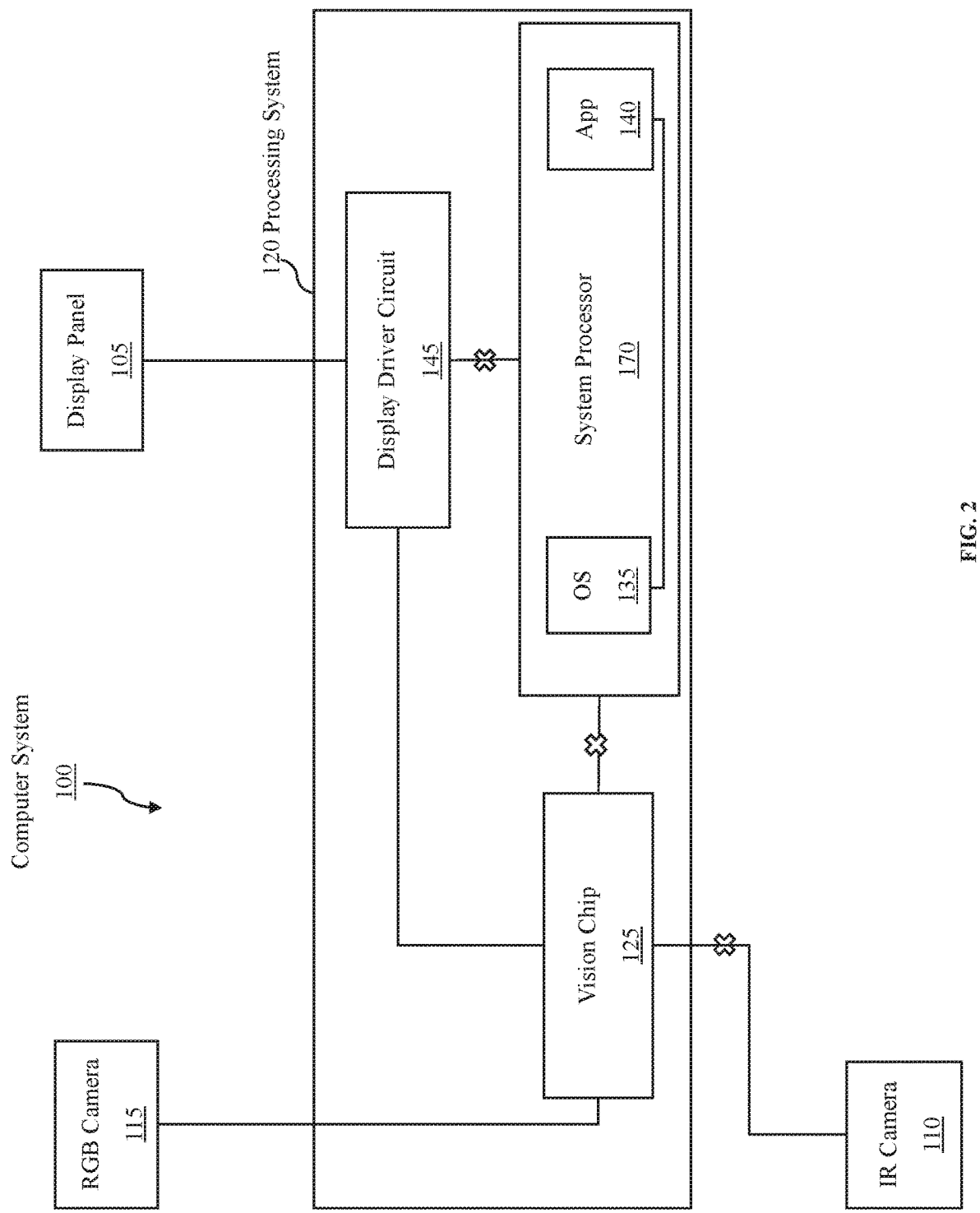
FIG. 2 shows a block diagram of a computer system in low power state in accordance with one or more embodiments of the disclosure.

FIG. 2 shows a block diagram of a computer system in low power state in accordance with one or more embodiments of the disclosure. As discussed in reference to FIG. 1A, the computer system 100 may include a display panel 105, an IR camera 110, an RGB camera 115, and a processing system 120.

The processing system 120, in one or more embodiments, includes a vision chip 125, a system processor 170, and a display driver circuit 145. Each of these components is subsequently described.

The system processor 170 may be any type of processor, e.g., a central processing unit (CPU), capable of executing an operating system (OS) 135 and one or more applications 140. The system processor 170 may communicatively interface with the vision chip 125. The system processor 170 may, thus, receive image data, e.g., image and/or video frames captured by the camera(s) 110, 115, through the vision chip 125. The system processor 170 may further communicatively interface with the display driver circuit 145. The system processor may thus control image content to be displayed in the display panel via the display driver circuit 145.

When in sleep mode (as illustrated in FIG. 2), the system processor 170 is in a power-saving state. The OS 135 and the applications 140 may not be actively executed when in sleep mode, but the computer system's state may be maintained to enable continued execution when exiting the sleep mode. Also, when in sleep mode, the computer system may monitor various inputs for signals indicating that exiting of the sleep mode is desired.

When in sleep mode, there may be no communication or limited communication between the vision chip 125 and the system processor 170, and no or limited communication between the display driver circuit 145 and the system processor 170. Specifically, for example, when in sleep mode, the system processor 170 may not control output on the display panel 105. Similarly, when in sleep mode, the system processor 170 may not process any input from the vision chip 125. Further, when in sleep mode, other components may also be deactivated to increase power savings. In the example of FIG. 2, the IR camera 110 is inactive.

In one or more embodiments, the vision chip 125 is a computer chip that is functionally separate and independent from the system processor 170. The vision chip may be optimized for low power consumption and may continue to operate even when the system processor is in sleep mode. The vision chip 125 may be, for example, a field programmable gate array (FPGA) which provides specific reprogrammable hardware technology, an ASIC, etc., and may enable the execution of instructions at a very low-power consumption, particularly in comparison to other chips, e.g., the system processor 170. In one or more embodiments, as the vision chip 125 continues to operate while the system processor 170 is in sleep mode, the vision chip 125 may be used to perform human presence detection (HPD), thereby detecting the presence of a user near the computer system 100 based on image data (image/video frames) captured by the RGB camera 115. The HPD may further determine the identity of the detected user, thereby performing a user identification, all while the computer system 100 is in sleep mode.

In one or more embodiments, the display driver circuit 145 drives the display panel 105. For example, the display driver circuit may control the refresh rate and the output to the display panel 105. The display driver circuit 145 may include or consist of, for example, a timing controller (Tcon), a display control board, or a microprocessor capable of controlling the refresh rate and the output to the display panel 105. In one or more embodiments, the vision chip 125 communicatively interfaces with the display driver circuit 145, allowing the vision chip 125 to instruct the display driver circuit 145 to display content in the display panel 105, even when the system processor 170 is in sleep mode.

Figure 3:
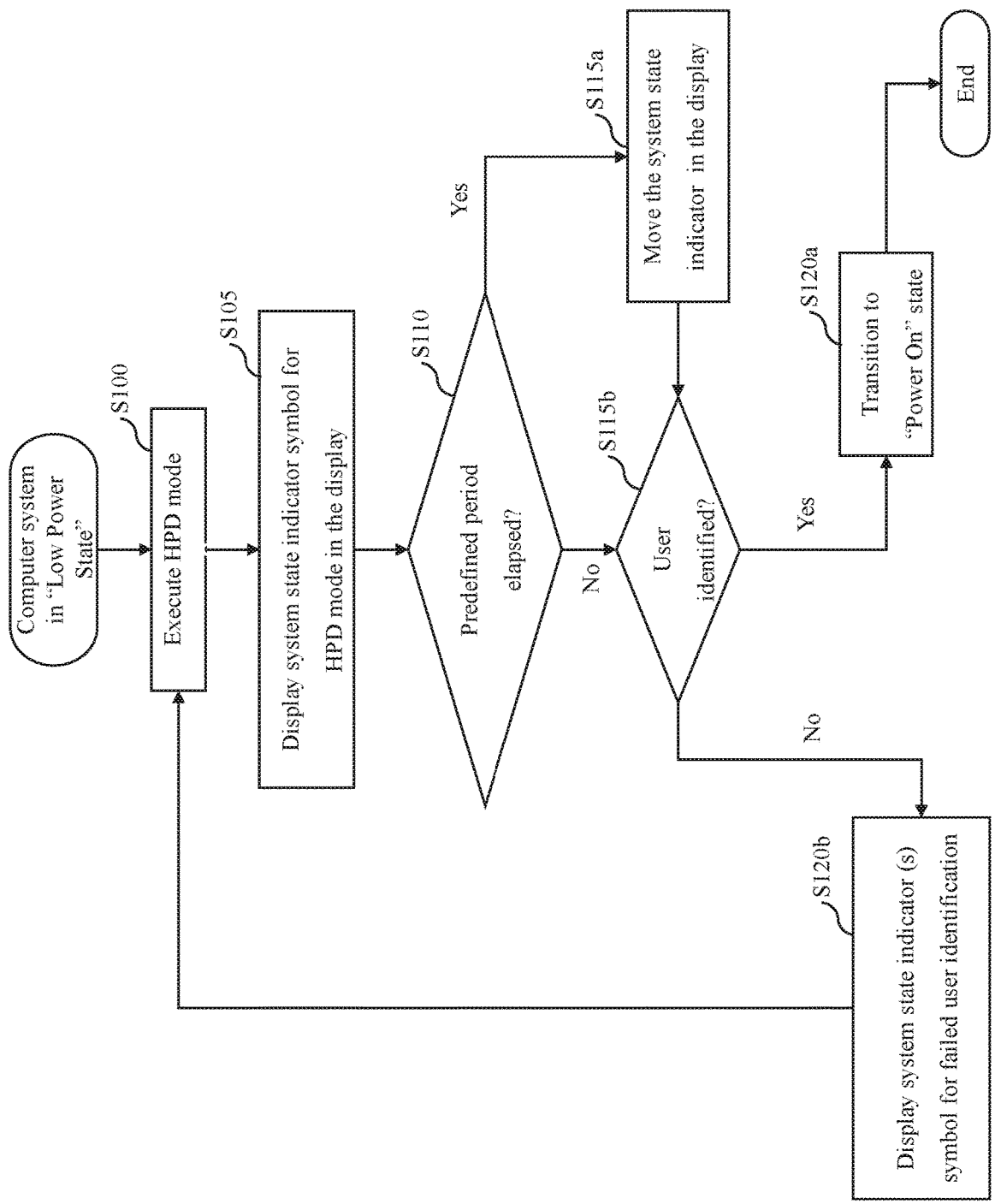
FIG. 3 shows a flowchart for a computer system in low power state and human presence detection (HPD) mode in accordance with one or more embodiments of the disclosure.
Figure 5:
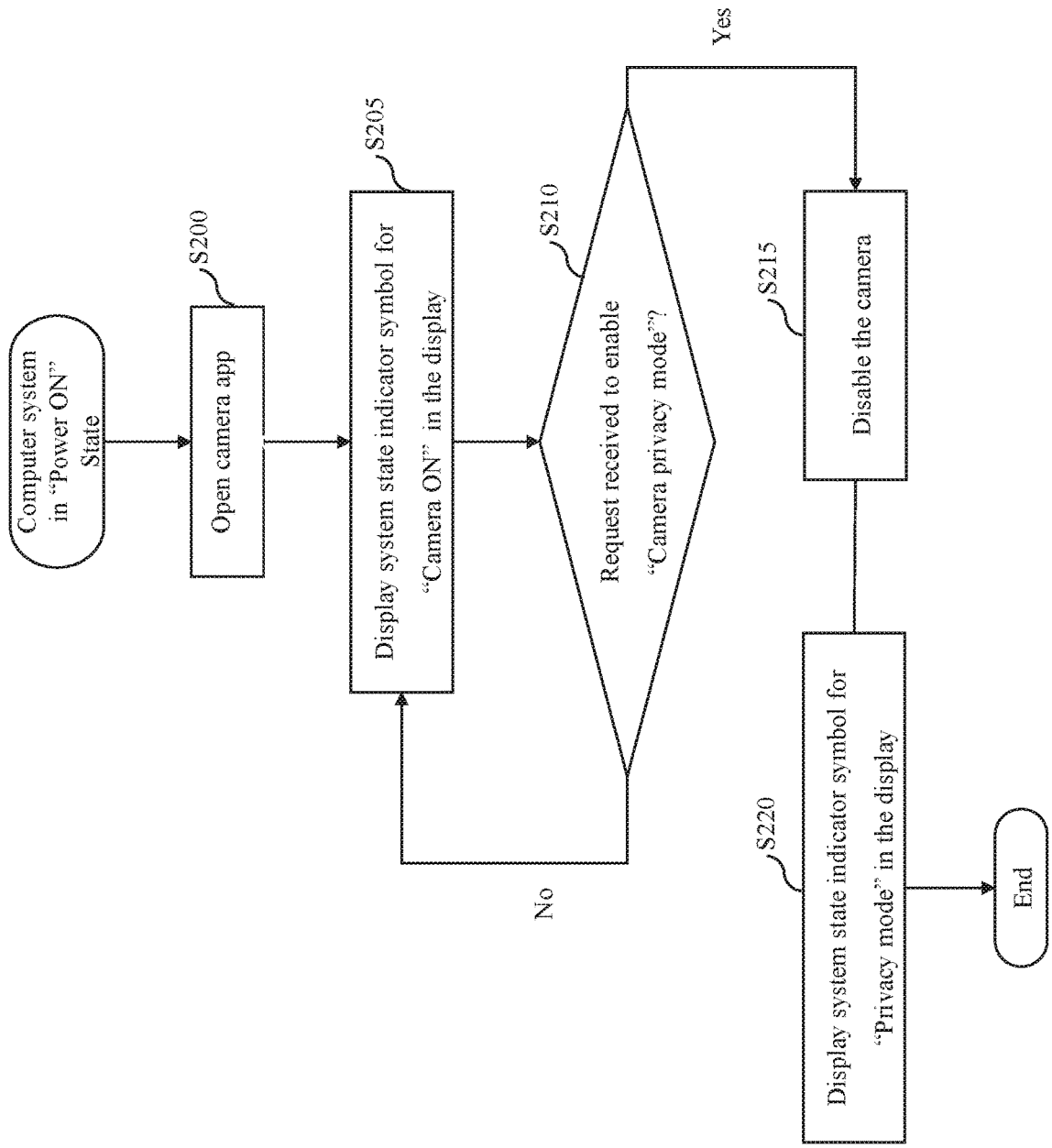
FIG. 5 shows a flowchart for a computer system in power on state and transitioning to privacy mode in accordance with one or more embodiments of the disclosure.
Figure 7:
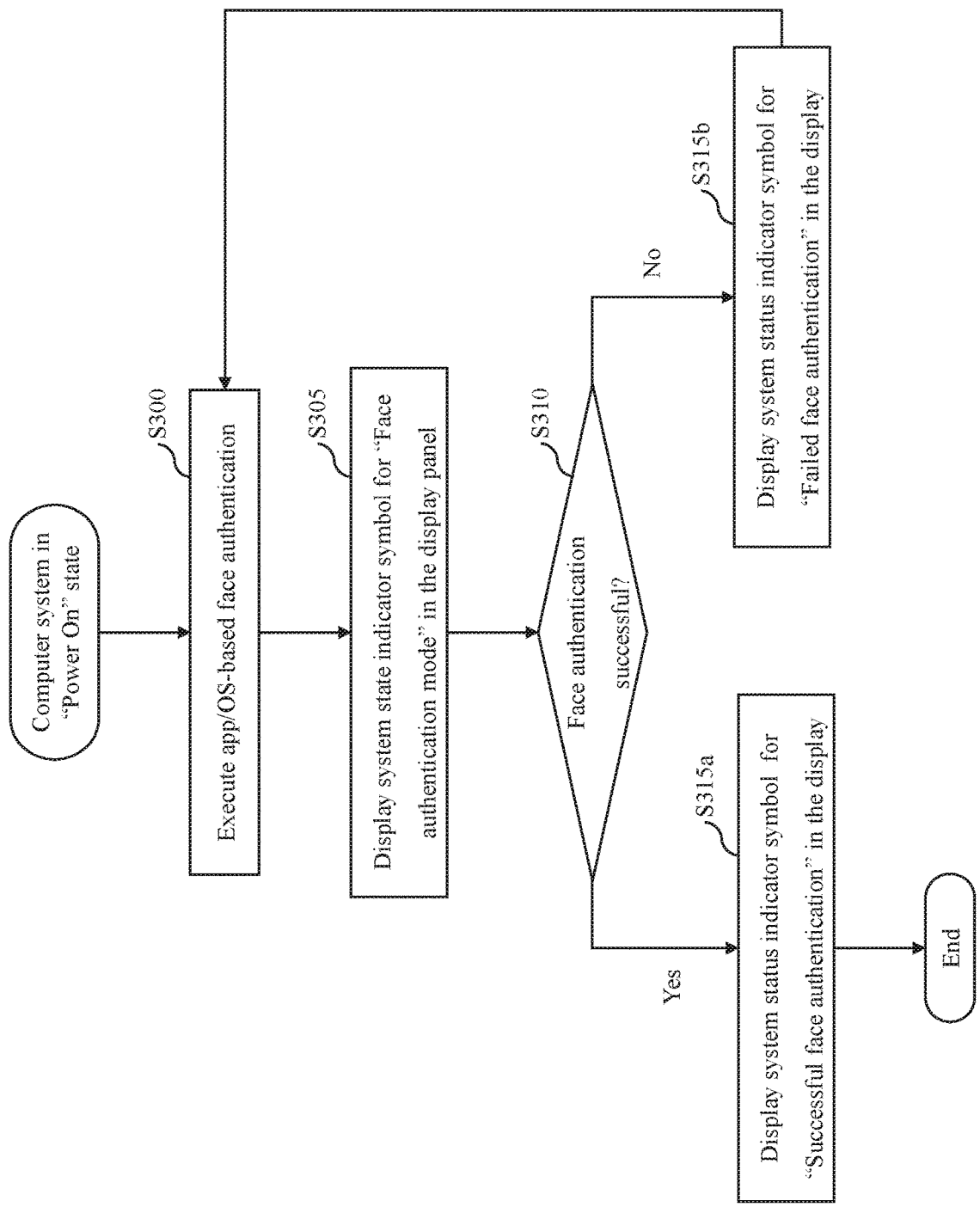
FIG. 7 shows a flowchart for the computer system in power on state and when performing a face authentication in accordance with one or more embodiments of the disclosure.

FIGS. 3, 5, and 7 show flowcharts in accordance with one or more embodiments. Broadly speaking, the flowcharts describe an updating of a state of the computer system based on image data received from the camera(s), and a displaying of a system state indicator symbol indicating the state of the computer system. In general, one or more of the steps of any of the flowcharts described herein may be combined, omitted, repeated, and/or performed in a different order than the order shown or described. Accordingly, the scope of the disclosure should not be considered limited to the specific arrangement of steps shown in any of the flowcharts described herein.

FIG. 3 shows a flowchart for the computer system in low power state in accordance with one or more embodiments of the disclosure. In the low power state, the system processor 170 may be in sleep mode, whereas the vision chip 125 is operating, as described in reference to FIG. 2.

In step S100, the vision chip 125 is performing HPD. The HPD may include one or more of a human presence detection, a user identification, and optionally a gaze detection and attention tracking. Any method for detecting the presence of the user, e.g., image processing methods, may be used to detect a user presence based on image data captured by the RGB camera 115. The HPD may further involve a detection of the identity of the user in order to determine whether the detected user is a proper user, e.g., a user registered to use the computer system. For example, the identity of the user may be detected based on facial features that have been previously trained. The HPD may be performed in two stages. First, the presence of a user may be detected. Based on the detection of the presence of the user, the identity of the user may still be unknown. Next, the identity of the user may be detected to determine whether the user is a proper user of the computer system. As a result, the more computationally demanding and power-consuming identity detection is performed only once a user is found to be present.

In step S105, the vision chip 125 instructs the display driver circuit 145 to drive the display panel 105 to display a system state indicator symbol for HPD mode. As illustrated in FIG. 2, the vision chip 125 communicatively interfaces with the display driver circuit 145 and, therefore, does not depend on the system processor 170 in order to display the system indicator symbol. The display driver circuit 145 activates pixels in the display panel as needed to display the state indicator symbol for HPD mode. Step S105 may be performed concurrently with step S100.

In step S110, a determination is made on whether a predefined period has elapsed. The predefined period may be any time interval, e.g., a few seconds, minutes, etc.

In step S115a, after establishing that the predefined period has elapsed, the position of the system state indicator symbol is updated. For example, the system state indicator symbol is moved by one or two pixels in a predetermined or random direction in order to prevent burn in and extend the longevity of the pixels of the display panel 105.

In step S115b, a test is performed to determine whether a power user was identified when performing step S100.

In step S120a, based on a successful user identification, the vision chip 125 causes the computer system to transition from the low power state to a power on state in which the system processor 170 is in active mode.

In step S120b, based on an unsuccessfully performed user identification, the vision chip 125 selects a system state indicator symbol for failed user identification as the system state indicator symbol used for the indicating of the state of the computer system and instructs the display driver circuit 145 to drive the display panel 105 to display the system state indicator symbol for failed user identification. The system state indicator symbol for failed user identification may be displayed for a few seconds or any other time interval to notify the user that the user identification has failed. The execution of the method may subsequently continue with step S100.

While the method of FIG. 3 described operations based on image data captured by the RGB camera 115, the operations may alternatively or additionally be performed on image data captured by the IR camera 110.

Figure 4:
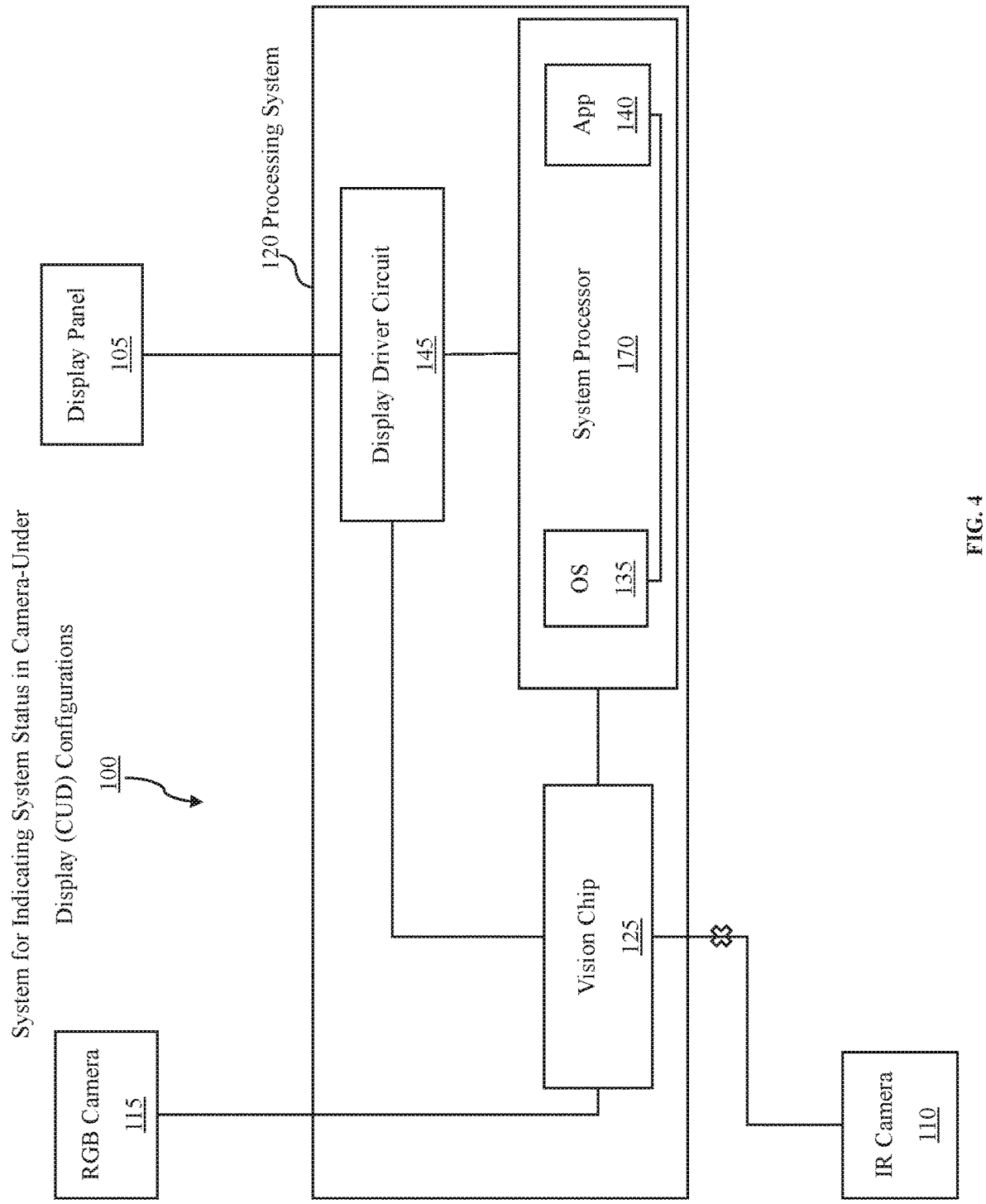
FIG. 4 shows a block diagram of a computer system in power on state in accordance with one or more embodiments of the disclosure.

FIG. 4 shows a block diagram of the computer system in power on state in accordance with one or more embodiments of the disclosure.

When in power on state, the OS 135 and the application(s) 140 may be actively executed and the system processor 170 may communicatively interface with the vision chip 125. The system processor 170, thus, may receive image and/or video frames from the camera(s) 110, 115, through the vision chip 125.

Further, when in power on state, the system processor 170 may communicatively interface with the display driver circuit 145. The system processor 170, thus, may control image content to be displayed in the display panel via the display driver circuit 145.

As previously discussed, the cameras 110, 115 are placed under the display panel 105. In absence of dedicated indicator lights, a user of the computer system 100 may not be able to determine the state of the cameras (e.g., active vs inactive). In order to address the resulting privacy concerns, a privacy mode is incorporated in the computer system 100, in accordance with one or more embodiments. The privacy mode may be activated by the user, e.g., by a keyboard command, a software command, etc. Additionally or alternatively, a dedicated capacitive sensor may exist, for example, near the cameras 110, 115 to allow the user to activate or deactivate the cameras 110, 115 by touching the capacitive sensor. Both cameras 110, 115 or only a single camera may be deactivated when in privacy mode.

FIG. 5 shows a flowchart for the computer system in power on state and transitioning to privacy mode in accordance with one or more embodiments of the disclosure. In the power on state, the system processor 170 and the vision chip 125 are operating, as described in reference to FIG. 4.

In step S200, an application is opened. The application, in one embodiment, is a camera application, e.g., an application that uses image data obtained from the camera (s) 110, 115. The application may be any type of application that accesses the camera, for example, a videoconferencing application, a recording application, etc. The application may be opened upon user request, based on a remote request, or for any other reason.

In step S205, the low power vision chip 125 instructs the display driver circuit 145 to drive the display panel 105 to display a system state indicator symbol for camera on. The displaying is performed in response to the opening of the application accessing the camera and is intended to make the user aware of the resulting camera activity. The vision chip 125 is able to perform step S205 because it communicatively interfaces with the system processor 170. The vision chip 125 may thus receive a notification making it aware of the camera activity. For example, an OS application programming interface (API) and/or driver may be used for the notification. The system state indicator symbol for camera on may be displayed until a request for privacy is made.

In step S210, a determination is made on whether a request to enable camera privacy mode has been received. The request may be made by a user, for example, to turn off the RGB camera 110.

In step S215, after determining that a request to enable camera privacy mode has been received, the vision chip 125 causes the computer system to transition to camera privacy mode. In one embodiment, the vision chip 125 receives a notification of the request, e.g. in the form of an API message. The vision chip 125 disables the RGB camera 115, e.g., by cutting power to the RGB camera 115, by not forwarding a camera image signal, etc.

In step S220, when disabling of the RGB camera 115, a state indicator symbol for privacy mode is displayed in the display panel 105. More specifically, the vision chip 125 selects a system state indicator symbol for camera privacy as the state indicator symbol to be displayed and then instructs the display driver circuit 145 to drive the display panel 105 to display the system state indicator symbol for privacy mode. The system state indicator symbol for privacy mode may be displayed around the area of the RGB camera 115 or any other suitable location in the display panel 105.

While the method of FIG. 5 described operations for the RGB camera 115, the operations may alternatively or additionally be performed for the IR camera 110.

Figure 6:
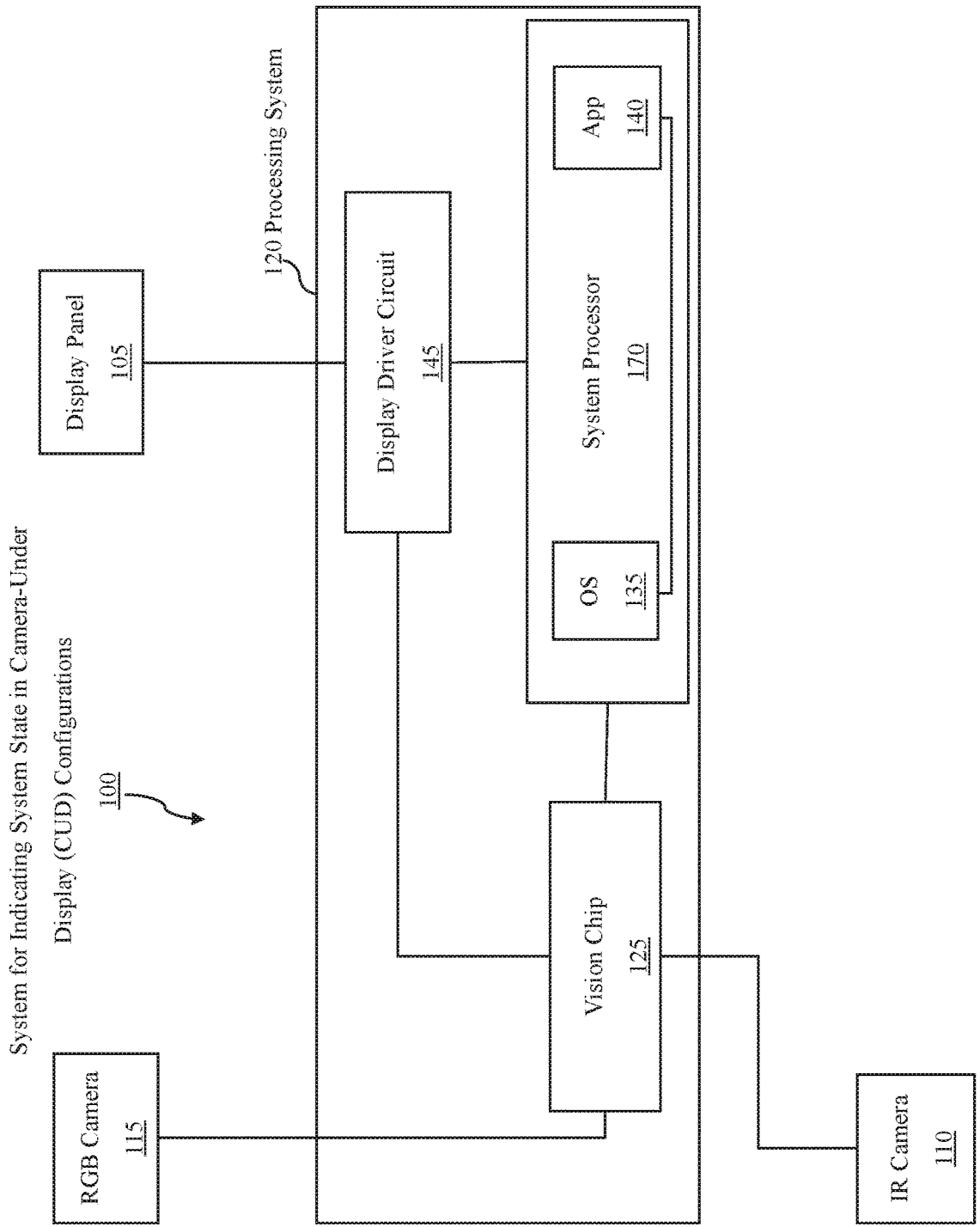
FIG. 6 shows a block diagram of a computer system in power on state in accordance with one or more embodiments of the disclosure.

FIG. 6 shows a block diagram of the computer system in power on state.

FIG. 7 shows a flowchart for the computer system in power on state and when performing a face authentication in accordance with one or more embodiments of the disclosure. The face authentication may be performed on a computer system in power on state, as shown in FIG. 6.

In step S300, a face authentication is initiated by one of the applications 140 or by the OS 135. The application may be any application that requires or benefits from a face authentication. The face authentication may be, for example, a Windows Hello face authentication.

Performing the face authentication may involve activating the cameras, e.g., the IR camera 110 and/or the RGB camera 115. The camera(s) 110, 115 may be activated by the vision chip 125, e.g., after receiving a request from the system processor 170. The request may be provided via an OS application programming interface (API) and may originate from the application 140.

In step S305, the vision chip 125 instructs the display driver circuit 145 to drive the display panel 105 to display a system state indicator symbol for face authentication mode. The displaying may be performed when performing step S300 and is intended to make the user aware of the ongoing face authentication.

In step S310, a determination is made on whether the face authentication has been successful. In step S315a, based on determining that the face authentication has been successful, the vision chip 125 may select a system state indicator symbol for successful face authentication as the system state indicator symbol to be displayed and subsequently may instruct the display driver circuit 145 to drive the display panel 105 to display the system state indicator symbol for successful face authentication.

In step S315b, based on determining that the face authentication was unsuccessful, the vision chip 125 may select a system state indicator symbol for failed face authentication as the system state indictor symbol to be displayed and subsequently may instruct the display driver circuit 145 to drive the display panel 105 to display the system state indicator symbol for failed face authentication. The execution of the method may subsequently continue with step S300.

Embodiments of the disclosure have one or more of the following advantages. Embodiments of the disclosure may provide a user with information on the current state of the computer system despite the absence of a bezel that would accommodate status indicator lights in traditional bezel-based display designs. For example, a system state indicator symbol may be displayed to indicate that a camera is active or inactive, the computer system is powered or sleeping, the computer system is in a particular mode (e.g., user presence detection, user authentication), etc. Accordingly, embodiments of the disclosure enable superior display designs that, for example, provide a larger display-to-body ratio and a better user perceptive experience including, for example, improved teleconferencing experiences with superior gaze tracking and eye contact when the cameras are centrally placed under the display. Further, embodiments of the disclosure, through the use of the vision chip, are particularly power efficient. The vision chip is functionally separate and independent from the system processor. The vision chip continues to operate even when the system processor is in sleep mode. The vision chip is used to perform HPD, all while the computer system is in sleep mode. In addition, the use of the vision chip makes it difficult or impossible for a malicious user to tamper with code executing on the vision chip. With the presentation of the system state indicator symbols being handled by the vision chip, a user can fully trust the system state indicator symbols and does not have to fear issues such as being secretly recorded by the camera(s).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A computer system, comprising:
   a display panel;
   an infrared camera and a visible camera both disposed under the display panel; and
   a processing system, comprising:
      a display driver circuit;
      a system processor; and
      a vision chip that independently from the system processor:
         processes image data captured by the visible camera or the infrared camera through the display panel,
         updates a state of the computer system based on the image data, and
         instructs the display driver circuit to drive the display panel to display a system state indicator, wherein
   updating the state of the computer system comprises, when the computer system is in a low power state:
      selecting and displaying a first system state indicator including a first indicator for a human presence detection (HPD) mode and a second indicator for an inactive camera state, wherein
         the first indicator is displayed around the visible camera in an first area of the display panel that overlaps the visible camera that provided the image data, and
         the second indicator is displayed around the infrared camera in a second area of the display panel that overlaps the infrared camera, the infrared camera being disabled in the lower power state;
      executing the HPD mode based on the image data;
      in response to successfully performing a user identification by the HPD mode, causing the computer system to transition from the low power state to a power on state; and
      in response to unsuccessfully performing the user identification by the HPD mode, selecting and displaying a second system state indicator including a third indicator for failed user identification and the second indicator for the inactive camera state, wherein
         the third indicator is displayed around the visible camera in the first area while the computer system remains in the low power state, and
         the second indicator is displayed around the infrared camera in the second area while the computer system remains in the low power state.

2. The computer system of claim 1, wherein:
the low power state is characterized by the system processor being in sleep mode, and
the power on state is characterized by the system processor being in active mode.

3. The computer system of claim 1, wherein the vision chip further:
based on determining that a predefined period has elapsed, instructs the display driver circuit to drive the display panel to move the system state indicator.

4. The computer system of claim 3, wherein moving the system state indicator comprises:
periodically moving a position of the system state indicator by one or two pixels.

5. The computer system of claim 1, wherein updating the state of the computer system comprises, when the computer system is in a power on state and executing a camera application by the system processor:
instructing the display driver circuit to drive the display panel to display a third indicator for camera on around at least one of the visible camera and the infrared camera in an area of the display panel that overlaps the at least one of the visible camera and the infrared camera that is on,
receiving a request to activate a camera privacy mode,
based on the receiving of the request:
causing the computer system to transition to the camera privacy mode, and
selecting and displaying a fourth indicator for camera privacy in the area of the display panel that overlaps the at least one of the visible camera and the infrared camera that is on.

6. The computer system of claim 1, wherein updating the state of the computer system comprises, when the computer system is in a power on state and executing a face authentication application by the system processor:
selecting a fifth indicator for face authentication mode,
successfully performing a first face authentication, and
based on the successful first face authentication, selecting and displaying a sixth indicator for successful face authentication.

7. The computer system of claim 6, wherein updating the state of the computer system comprises:
unsuccessfully performing a second face authentication, and
based on the unsuccessful second face authentication, selecting and displaying a seventh indicator for failed face authentication.

8. A method for indicating a state of a computer system including a display panel with an infrared camera and a visible camera both disposed under the display panel, the method comprising:
processing image data obtained from the visible camera or the infrared camera, by a vision chip independently from a system processor;
updating the state of the computer system, by the vision chip independently from the system processor, based on the image data; and
instructing a display driver circuit, by the vision chip independently from the system processor, to drive the display panel to display a system state indicator, wherein
updating the state of the computer system comprises, when the computer system is in a low power state:
selecting and displaying a first system state indicator including a first indicator for a human presence detection (HPD) mode and a second indicator for an inactive camera state, wherein
the first indicator is displayed around the visible camera in an first area of the display panel that overlaps the visible camera that provided the image data, and
the second indicator is displayed around the infrared camera in a second area of the display panel that overlaps the infrared camera, the infrared camera being disabled in the lower power state;
executing the HPD mode based on the image data;
in response to successfully performing a user identification by the HPD mode, causing the computer system to transition from the low power state to a power on state; and
in response to unsuccessfully performing the user identification by the HPD mode, selecting and displaying a second system state indicator including a third indicator for failed user identification and the second indicator for the inactive camera state, wherein
the third indicator is displayed around the visible camera in the first area while the computer system remains in the low power state, and
the second indicator is displayed around the infrared camera in the second area while the computer system remains in the low power state.

9. The method of claim 8, wherein:
the low power state is characterized by the system processor being in sleep mode; and
the power on state is characterized by the system processor being in active mode.

10. The method of claim 8, wherein the vision chip further:
based on determining that a predefined period has elapsed, instructs the display driver circuit to drive the display panel to move the system state indicator.

11. The method of claim 10, wherein moving the system state indicator comprises:
periodically moving a position of the system state indicator by one or two pixels.

12. The method of claim 8, wherein updating the state of the computer system comprises, when the computer system is in a power on state and executing a camera application by the system processor:
instructing the display driver circuit to drive the display panel to display a third indicator for camera on around at least one of the visible camera and the infrared camera in an area of the display panel that overlaps the at least one of the visible camera and the infrared camera that is on,
receiving a request to activate a camera privacy mode,
based on the receiving of the request:
causing the computer system to transition to the camera privacy mode, and
selecting and displaying a fourth indicator for camera privacy in the area of the display panel that overlaps the at least one of the visible camera and the infrared camera that is on.

13. The method of claim 8, wherein updating the state of the computer system comprises, when the computer system is in a power on state and executing a face authentication application by the system processor:
selecting a fifth indicator for face authentication mode,
successfully performing a first face authentication, and
based on the successful first face authentication, selecting and displaying a sixth indicator for successful face authentication.

14. The method of claim 13, wherein updating the state of the computer system comprises:
  unsuccessfully performing a second face authentication, and
  based on the unsuccessful second face authentication, selecting and displaying a seventh indicator for failed face authentication.

\* \* \* \* \*